(12) United States Patent
Miyaji

(10) Patent No.: US 11,272,066 B2
(45) Date of Patent: Mar. 8, 2022

(54) METHOD FOR CONTROLLING IMAGE FORMING APPARATUS BY GENERATING LEARNED MODEL AND IMAGE FORMING APPARATUS WITH LEARNED MODEL

(71) Applicant: KYOCERA Document Solutions Inc., Osaka (JP)

(72) Inventor: Naoya Miyaji, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/094,882

(22) Filed: Nov. 11, 2020

(65) Prior Publication Data

US 2021/0152698 A1    May 20, 2021

(30) Foreign Application Priority Data

Nov. 15, 2019  (JP) .............................. JP2019-207127

(51) Int. Cl.
*H04N 1/00* (2006.01)
*G03G 15/00* (2006.01)
*G06N 20/00* (2019.01)

(52) U.S. Cl.
CPC ..... *H04N 1/00068* (2013.01); *G03G 15/5033* (2013.01); *G03G 15/751* (2013.01); *G06N 20/00* (2019.01); *H04N 1/00074* (2013.01); *H04N 1/00084* (2013.01)

(58) Field of Classification Search
CPC .......... H04N 1/00034; H04N 1/00039; H04N 1/00068; H04N 1/00074; H04N 1/00084; H04N 1/00832; G06F 3/121; G06F 3/1229; G06F 3/1235; G03G 15/5033; G03G 15/751; G03G 15/553; G06N 20/00
See application file for complete search history.

(56) References Cited

U.S. PATENT DOCUMENTS

| 5,204,718 | A | * | 4/1993 | Morita ................... H04N 1/295 399/74 |
| 5,778,279 | A | * | 7/1998 | Kawai ................ G03G 15/5079 399/26 |
| 9,335,697 | B2 | * | 5/2016 | Yoshida ............... G03G 15/553 |
| 2020/0134373 | A1 | * | 4/2020 | Oikawa ................. G06F 3/1208 |

FOREIGN PATENT DOCUMENTS

JP      2016-057420       4/2016

* cited by examiner

*Primary Examiner* — Kent Yip
(74) *Attorney, Agent, or Firm* — Lex IP Meister, PLLC

(57) ABSTRACT

An image forming apparatus includes a member having a certain function, a learned model, and an estimation unit. The learned model is obtained by learning of a self-organizing map model having an input layer and an output layer. The estimation unit gives multidimensional input data related to the member to the input layer, and estimates a state of the member on the basis of one of a plurality of nodes of the output layer.

9 Claims, 6 Drawing Sheets

FIG. 4

| NODE | INPUT DATA AVERAGE VALUE | | | | STATE |
|---|---|---|---|---|---|
| | D1 | D2 | D3 | D4 | |
| 1 | SMALL | NORMAL | NORMAL | LOW | GOOD |
| 2 | NORMAL | SMALL | NORMAL | LOW | |
| 3 | SMALL | NORMAL | NORMAL | NORMAL | |
| 4 | NORMAL | NORMAL | NORMAL | NORMAL | |
| 5 | SMALL | NORMAL | NORMAL | LOW | |
| 6 | SMALL | NORMAL | THIN | NORMAL | |
| 7 | SMALL | NORMAL | NORMAL | HIGH | |
| 8 | NORMAL | NORMAL | NORMAL | HIGH | |
| 9 | LARGE | SMALL | NORMAL | NORMAL | NORMAL |
| 10 | SMALL | HIGH | NORMAL | NORMAL | |
| 11 | SMALL | HIGH | NORMAL | NORMAL | |
| 12 | LARGE | HIGH | NORMAL | NORMAL | |
| 13 | SMALL | HIGH | SMALL THIN TENDENCY | LOW | DETERIORATING TENDENCY |
| 14 | SMALL | UPPER LIMIT | NORMAL | LOW | LSU EXPOSURE AMOUNT REACHES UPPER LIMIT |
| 15 | LARGE | UPPER LIMIT | LARGE THIN TENDENCY | HIGH | UPPER LIMIT OF LSU EXPOSURE AMOUNT NEEDS TO BE CORRECTED |
| 16 | LARGE | UPPER LIMIT | EXTREMELY THIN | HIGH | MAINTENANCE IS NECESSARY, MEMBER REPLACEMENT IS NECESSARY |

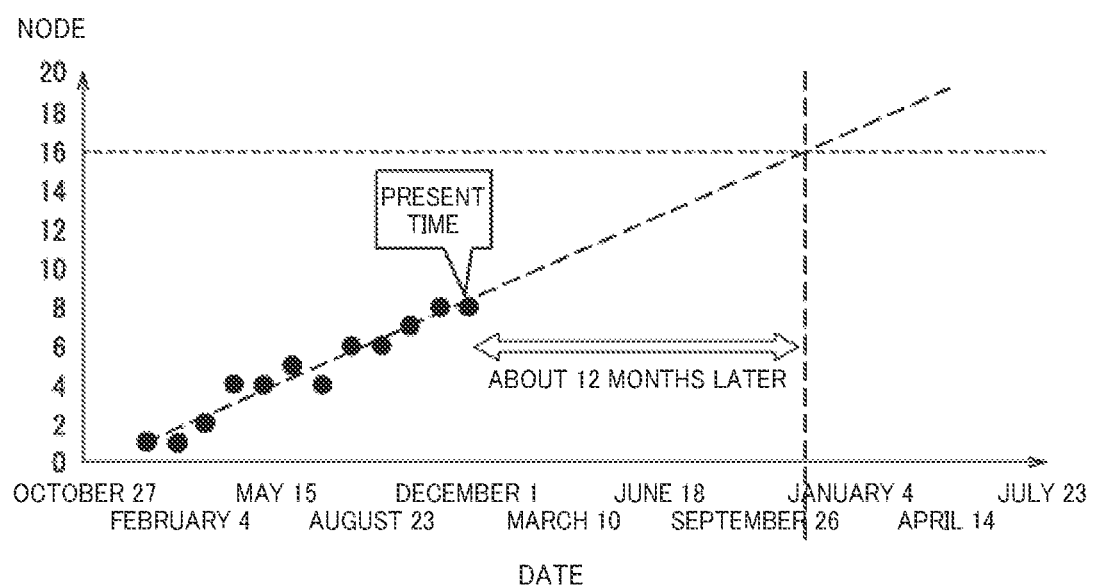

METHOD FOR CONTROLLING IMAGE FORMING APPARATUS BY GENERATING LEARNED MODEL AND IMAGE FORMING APPARATUS WITH LEARNED MODEL

INCORPORATION BY REFERENCE

This application is based upon, and claims the benefit of priority from, corresponding Japanese Patent Application No. 2019-207127 filed in the Japan Patent Office on Nov. 15, 2019, the entire contents of which are incorporated herein by reference.

BACKGROUND

Field of the Invention

The present disclosure relates to a method for generating a learned model and an image forming apparatus.

Description of Related Art

A conventional image forming apparatus calculates, as a life prediction value, a ratio of the number of actual rotations of a photoconductor drum to the number of durable life rotations.

SUMMARY

A method for generating a learned model of the present disclosure is a method for generating a learned model for estimating a state of a member of an image forming apparatus. The method includes preparing a self-organizing map model having an input layer and an output layer and giving multidimensional input data related to the member to the input layer and learning the self-organizing map model until a plurality of nodes of the output layer each indicate a different state of the member.

An image forming apparatus of the present disclosure includes a member having a certain function, a learned model, and an estimation unit. The learned model is obtained by learning of a self-organizing map model having an input layer and an output layer. The estimation unit gives multidimensional input data related to the member to the input layer, and estimates a state of the member on the basis of one of a plurality of nodes of the output layer.

BRIEF DESCRIPTION OF THE DRAWINGS

FIG. 4 is a diagram illustrating an example of characterization of each of 16 nodes of an output layer of the learned model;

FIG. 6 is a diagram for explaining an example of a life prediction step.

DETAILED DESCRIPTION

Figure 1:
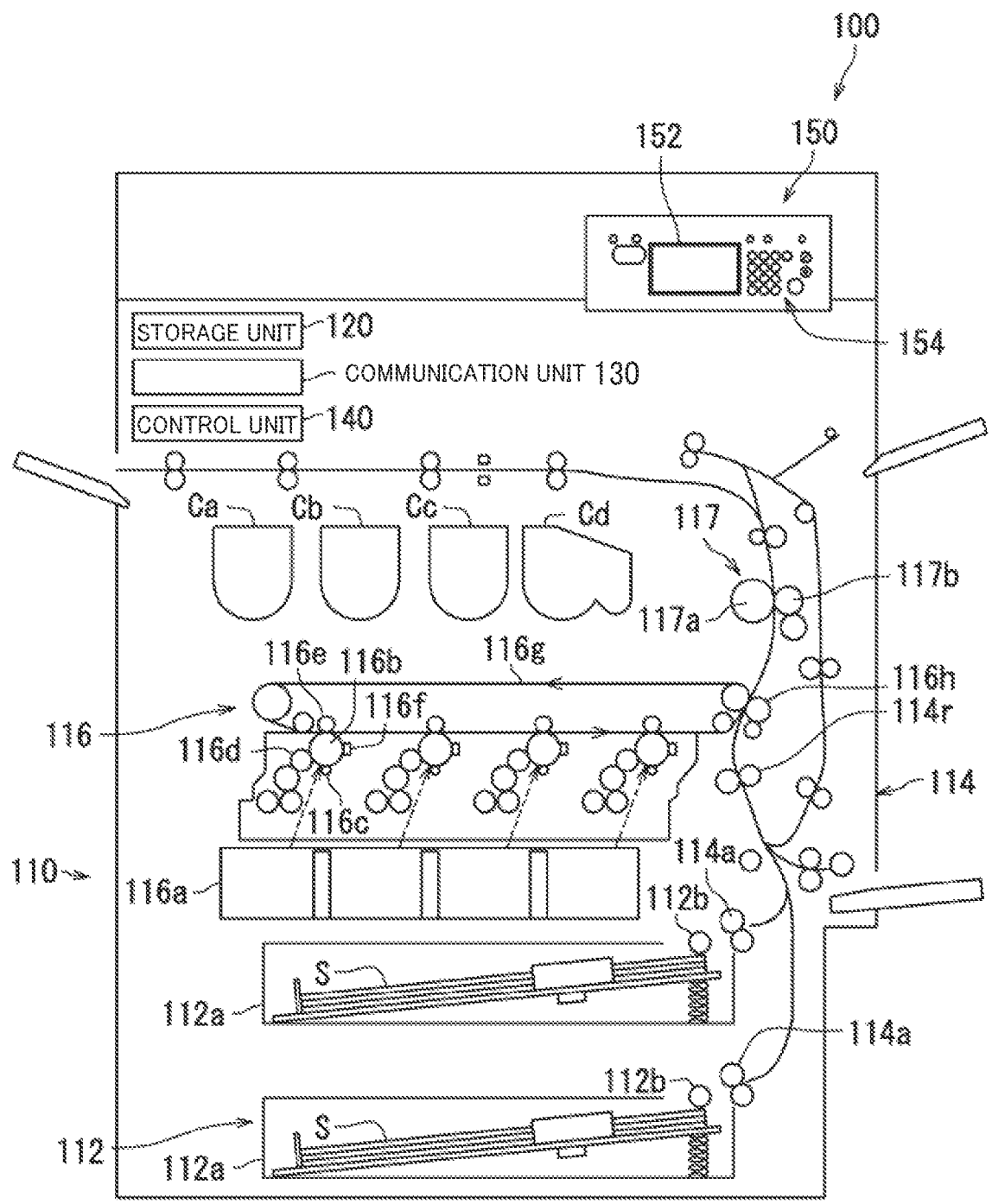
FIG. 1 is a diagram illustrating an example of an image forming apparatus according to an embodiment.

Hereinafter, an embodiment of the present disclosure will be described with reference to the drawings. In the drawings, the same or corresponding parts are denoted by the same reference numerals, and will not be repeatedly described.

First, an image forming apparatus 100 according to the embodiment will be described with reference to FIG. 1. FIG. 1 is a diagram illustrating an example of the image forming apparatus 100. The image forming apparatus 100 forms an image on a sheet S. The image forming apparatus 100 is, for example, a printer, a copying machine, or a compound machine.

The image forming apparatus 100 includes an image forming unit 110, a storage unit 120, a communication unit 130, a control unit 140, and an input/output unit 150.

The image forming unit 110 forms an image on the sheet S. For example, the sheet S is a plain paper, recycled paper, thin paper, thick paper, coated paper, or an OHP (Overhead Projector) sheet.

The image forming unit 110 includes a feeding section 112, a conveying section 114, toner containers Ca to Cd, and an image forming section 116.

The feeding section 112 includes a plurality of cassettes 112a and a plurality of feeding rollers 112b. Each cassette 112a houses a plurality of the sheets S. Each feeding roller 112b feeds the sheet S located on an uppermost surface of the plurality of sheets S housed in the cassette 112a one by one.

The conveying section 114 conveys the sheet S fed by the feeding section 112 to the image forming section 116. The conveying section 114 includes a plurality of conveying rollers 114a. A conveying path of the sheet S is formed by the plurality of conveying rollers 114a. After the image forming section 116 forms an image on the sheet S, the conveying section 114 further conveys the sheet S from the image forming section 116 and discharges the sheet S to the outside of the image forming apparatus 100.

The conveying rollers 114a include resist rollers 114r. The resist rollers 114r adjust timing of conveying the sheet S to the image forming section 116. The resist rollers 114r temporarily stop the conveyance of the sheet S, and convey the sheet S to the image forming section 116 according to specific timing of the image forming section 116.

Each of the toner containers Ca to Cd is detachably mounted on the image forming apparatus 100. The toner containers Ca to Cd house respective different colored toners. The respective toners of the toner containers Ca to Cd are supplied to the image forming section 116.

For example, the toner container Ca houses a yellow-colored toner and supplies the yellow-colored toner to the image forming section 116. The toner container Cb houses a magenta-colored toner and supplies the magenta-colored toner to the image forming section 116. The toner container Cc houses a cyan-colored toner and supplies the cyan-colored toner to the image forming section 116. The toner container Cd houses a black-colored toner and supplies the black-colored toner to the image forming section 116.

The image forming section 116 forms an image based on image data on the sheet S by using the respective toners housed in the toner containers Ca to Cd. The image forming section 116 includes an exposure part 116a, photoconductor drums 116b, charging parts 116c, developing parts 116d, primary transfer rollers 116e, cleaning parts 116f, an intermediate transfer belt 116g, a secondary transfer roller 116h, and a fixing part 117.

The intermediate transfer belt 116g is rotated by rotating rollers that rotate according to power of a motor. The developing parts 116d are mounted with motors. The toners in the developing parts 116d are stirred with the rotation of the motors.

The respective photoconductor drums 116b, the respective charging parts 116c, the respective developing parts 116d, the respective primary transfer rollers 116e, and the respective cleaning parts 116f are provided corresponding to the toner containers Ca to Cd. The plurality of photoconductor drums 116b abut on an outer surface of the intermediate transfer belt 116g, and are disposed along the direction of rotation of the intermediate transfer belt 116g. The plurality of primary transfer rollers 116e are provided corresponding to the plurality of photoconductor drums 116b. The plurality of primary transfer rollers 116e face the plurality of photoconductor drums 116b with the intermediate transfer belt 116g therebetween.

Each of the charging parts 116c charges a peripheral surface of the photoconductor drum 116b. The exposure part 116a irradiates each of the photoconductor drums 116b with laser light based on the image data, and an electrostatic latent image is formed on the peripheral surface of each photoconductor drum 116b. Each developing part 116d adheres the toner to the electrostatic latent image to develop the electrostatic latent image, and forms a toner image on the peripheral surface of the photoconductor drum 116b. Each photoconductor drum 116b carries the toner image. Each primary transfer roller 116e transfers the toner image formed on the photoconductor drum 116b to the outer surface of the intermediate transfer belt 116g. Each cleaning part 116f removes remaining toner on the peripheral surface of the photoconductor drum 116b.

The photoconductor drum 116b corresponding to the toner container Ca forms a yellow-colored toner image based on the electrostatic latent image, and the photoconductor drum 116b corresponding to the toner container Cb forms a magenta-colored toner image based on the electrostatic latent image. The photoconductor drum 116b corresponding to the toner container Cc forms a cyan-colored toner image based on the electrostatic latent image, and the photoconductor drum 116b corresponding to the toner container Cd forms a black-colored toner image based on the electrostatic latent image.

The plurality of colored toner images are superimposed and transferred from the photoconductor drums 116b, so that an image is formed on the outer surface of the intermediate transfer belt 116g. Therefore, the intermediate transfer belt 116g carries the image. The secondary transfer roller 116h transfers the image formed on the outer surface of the intermediate transfer belt 116g to the sheet S.

The fixing part 117 fixes the toner images to the sheet S by heating and pressurizing the sheet S having the toner images transferred thereto. The fixing part 117 includes a heating roller 117a and a pressure roller 117b. The conveying section 114 discharges the sheet S having the toner images fixed thereon to the outside of the image forming apparatus 100.

The storage unit 120 includes a main storage device such as a semiconductor memory, and stores data and a computer program.

The communication unit 130 communicates with other electronic devices via a network. The communication unit 130 can transmit information to a serviceman, for example, via a cloud on the Internet.

The control unit 140 includes a processor such as a CPU (Central Processing Unit). The processor of the control unit 140 controls each configuration of the image forming apparatus 100 by executing the computer program stored in the storage unit 120. The storage unit 120 and the control unit 140 may be implemented as an MPU (Micro Controller Unit).

The input/output unit 150 notifies a user of various information and receives an instruction from the user. The input/output unit 150 has a display part 152 and a reception part 154. The display part 152 is, for example, a touch panel including a liquid crystal display. The reception part 154 includes, for example, a numeric keypad, a start key, and a cancel key.

Figure 2:
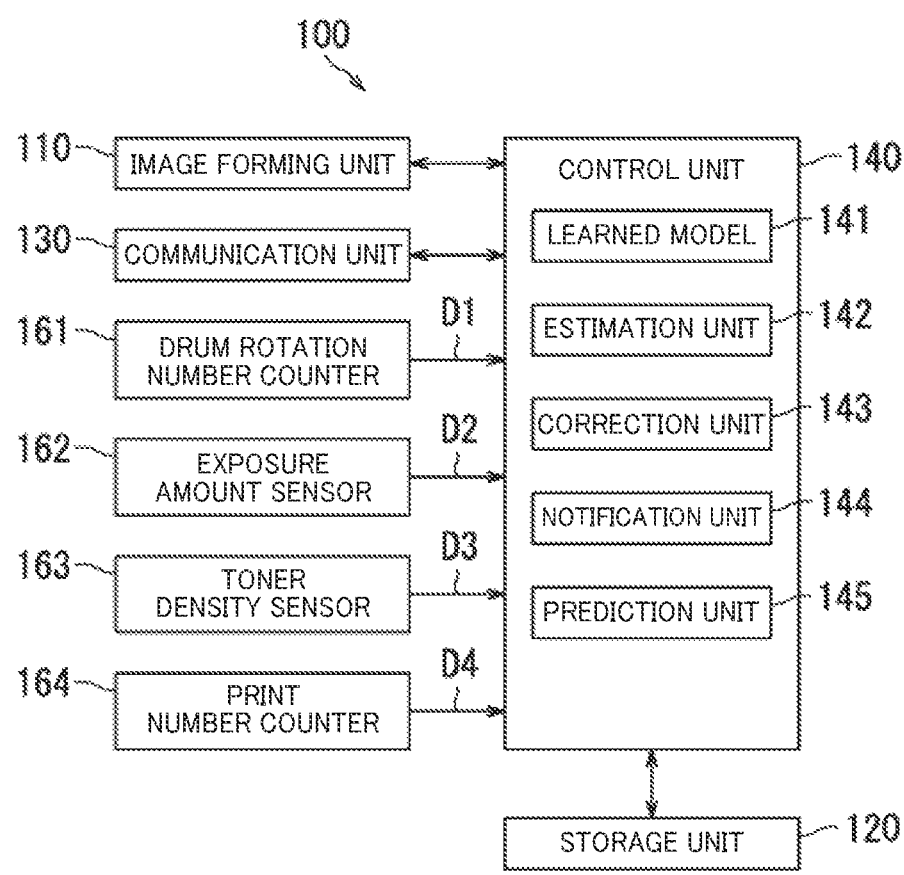
FIG. 2 is a block diagram illustrating an example of a circuit configuration of the image forming apparatus.

Now, a circuit configuration of the image forming apparatus 100 will be described with reference to FIGS. 1 and 2. FIG. 2 is a block diagram illustrating an example of the circuit configuration of the image forming apparatus 100.

As illustrated in FIG. 2, the image forming apparatus 100 further includes a drum rotation number counter 161, an exposure amount sensor 162, a toner density sensor 163, and a print number counter 164.

The drum rotation number counter 161 provides the control unit 140 with first data D1 indicating a total traveling distance of each photoconductor drum 116b. The drum rotation number counter 161 is mounted on a motor that rotates each photoconductor drum 116b. The first data D1 indicates, for example, the number of actual rotations of each photoconductor drum 116b. A value obtained by multiplying the peripheral length of the photoconductor drum 116b by the number of actual rotations of the photoconductor drum 116b indicates the total traveling distance of the photoconductor drum 116b.

The exposure amount sensor 162 provides the control unit 140 with second data D2 indicating an exposure amount of the laser light from the exposure part 116a to each photoconductor drum 116b. The exposure part 116a includes an LSU (Laser Scanning Unit). The second data D2 indicates, for example, an LSU exposure amount.

The toner density sensor 163 provides the control unit 140 with third data D3 indicating the density of the toner image transferred from each photoconductor drum 116b to the intermediate transfer belt 116g. The third data D3 indicates, for example, the density of a patch formed on the surface of the intermediate transfer belt 116g.

The print number counter 164 provides the control unit 140 with fourth data D4 indicating a frequency of use of the image forming apparatus 100 by a user. The fourth data D4 indicates, for example, the number of prints per day.

As illustrated in FIG. 2, the control unit 140 includes a learned model 141, an estimation unit 142, a correction unit 143, a notification unit 144, and a prediction unit 145. The control unit 140 functions as the learned model 141, the estimation unit 142, the correction unit 143, the notification unit 144, and the prediction unit 145 by executing the computer program stored in the storage unit 120.

The learned model 141 is obtained by unsupervised learning of a SOM (Self-Organizing Maps) model.

The estimation unit 142 estimates a present state of each photoconductor drum 116b using the learned model 141.

The correction unit 143 corrects an upper limit of the LSU exposure amount such that each photoconductor drum 116b is substantially self-repaired when the LSU exposure amount reaches the upper limit.

The notification unit 144 issues a state notification indicating a state of each photoconductor drum 116b estimated by the estimation unit 142 via the communication unit 130. The serviceman can acquire information repaired for necessary maintenance treatment from the state notification, for example, via a cloud on the Internet.

The prediction unit 145 predicts a life of each photoconductor drum 116b on the basis of the transition of the state of the photoconductor drums 116b estimated by the estimation unit 142.

Figure 3:
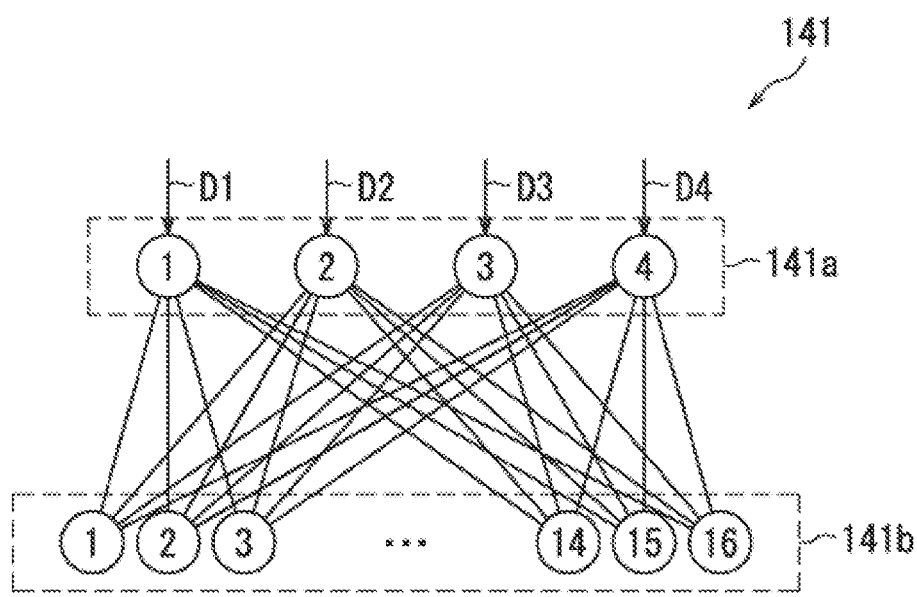
FIG. 3 is a diagram illustrating an example of a learned model.

Now, the learned model 141 will be described with reference to FIGS. 2 and 3. FIG. 3 is a diagram illustrating an example of the learned model 141.

As illustrated in FIG. 3, generation of the learned model 141 begins with preparation of the SOM model which is one of neural networks. The SOM model has an input layer 141a and an output layer 141b. For example, the input layer 141a has 4 neurons, and the output layer 141b has 16 neurons. Each neuron of the input layer 141a is coupled with all the neurons of the output layer 141b. A coupling coefficient is defined for each coupling.

At the time of learning of the SOM model, four-dimensional input data related to the photoconductor drum 116b is given to the 4 neurons of the input layer 141a. The four-dimensional input data includes the first data D1 to the fourth data D4. The first data D1 to the fourth data D4 are each normalized to a range of 0 to 1. For example, life cycle data for about 2 years of the photoconductor drums 116b in the 100 image forming apparatuses 100 in operation on a market is used.

The learning of the SOM model continues according to well-known algorithm until the 16 neurons of the output layer 141b, namely, 16 nodes, each indicate a different state of the photoconductor drum 116b. At this point, all coupling coefficients between the input layer 141a and the output layer 141b are determined. As a result, the learned model 141 that outputs a node value indicating a present state of the photoconductor drum 116b for new four-dimensional input data is generated. The learned model 141 functions as a classifier that classifies the present state of the photoconductor drum 116b into one of 16 states.

Now, with reference to FIGS. 1 to 4, characterization of each of the 16 nodes of the output layer 141b of the learned model 141 will be described. FIG. 4 is a diagram illustrating an example of the characterization of each of the 16 nodes.

The output layer 141b of the generated learned model 141 has the 16 nodes. For each node, an input data average value and a Euclidean distance from an origin are calculated. From these calculation results, each node is characterized. Moreover, the larger the Euclidean distance from the origin is, the larger the node value to be given is. In FIG. 4, a characteristic of each node is indicated as the "state" of the photoconductor drum 116b.

As illustrated in FIG. 4, the nodes with the node values of "1" to "8" each indicate that the state of the photoconductor drum 116b is "good". The nodes with the node values of "9" to "12" each indicate that the state of the photoconductor drum 116b is "normal". The node with the node value of "13" indicates that the state of the photoconductor drum 116b is "deteriorating tendency". The node with the node value of "14" indicates that the toner density is normal, but the LSU exposure amount reaches the upper limit. The node with the node value of "15" indicates that it is difficult to keep the toner density because the toner density is thin and the LSU exposure amount reaches the upper limit. That is, the node with the node value of "15" indicates that upper limit correction by the correction unit 143 is necessary because the LSU exposure amount reaches the upper limit. The node with the node value of "16" indicates that desired tone density is not already obtained. That is, the node with the node value of "16" indicates that the photoconductor drum 116b needs to be replaced.

Figure 5:
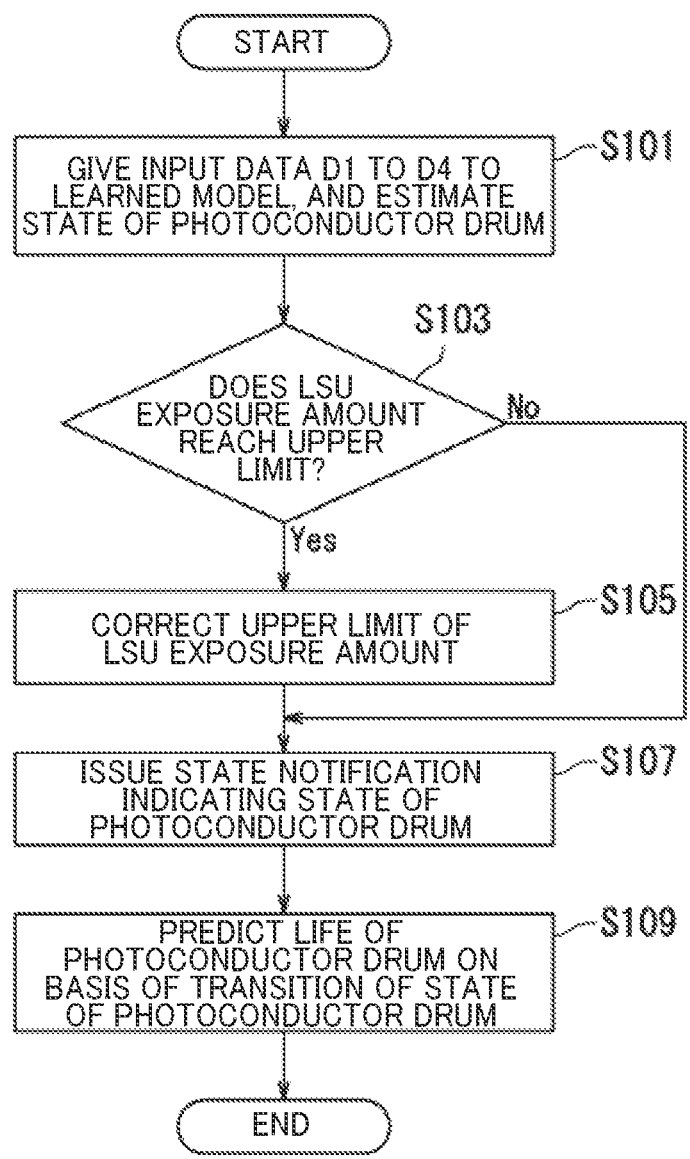
FIG. 5 is a flowchart illustrating an example of operation of a control unit.

Now, operation of the control unit 140 will be described with reference to FIGS. 1 to 5. FIG. 5 is a flowchart illustrating an example of the operation of the control unit 140.

Step S101: As illustrated in FIG. 5, the estimation unit 142 gives the four-dimensional input data regarding the photoconductor drum 116b to be diagnosed, that is, the first data D1 to the fourth data D4 to the learned model 141, and estimates the present state of the photoconductor drum 116b. When the processing of step S101 is completed, the processing of the control unit 140 proceeds to step S103.

Step S103: The correction unit 143 determines whether or not the LSU exposure amount reaches the upper limit. In a case where the correction unit 143 determines that the LSU exposure amount reaches the upper limit (Yes in step S103), the processing of the control unit 140 proceeds to step S105. In a case where the correction unit 143 determines that the LSU exposure amount does not reach the upper limit (No in step S103), the processing of the control unit 140 proceeds to step S107.

Step S105: The correction unit 143 corrects the control of the LSU so as to increase the upper limit of the LSU exposure amount in a case where the toner density detected by the toner density sensor 163 is thin. As a result, the photoconductor drum 116b is substantially self-repaired. That is, the photoconductor drum 116b can be repaired before the photoconductor drum 116b is replaced. When the processing of step S105 is completed, the processing of the control unit 140 proceeds to step S107.

Step S107: The notification unit 144 issues a state notification indicating the present state of the photoconductor drum 116b via the communication unit 130. The state notification includes, for example, the first data D1 to the fourth data D4 and a node value output from the learned model 141. As a result, it is possible to prompt the serviceman to perform the necessary maintenance treatment. When the processing of step S107 is completed, the processing of the control unit 140 proceeds to step S109.

Step S109: The prediction unit 145 predicts the life of the photoconductor drum 116b on the basis of transition of the state of the photoconductor drum 116b estimated by the estimation unit 142. When the processing of the step S109 is completed, the processing of the control unit 140 Is finished.

Now, the step S109, that is, a life prediction step will be described with reference to FIGS. 1 to 6. FIG. 6 is a diagram for explaining an example of the life prediction step.

As illustrated in FIG. 6, the prediction unit 145 records a node value output from the learned model 141 every day. The prediction unit 145 records time when the node value reaches "16" on the basis of the transition of the node values. As a result, in the example of FIG. 6, it is predicted that a remaining life of the photoconductor drum 116b is about 12 months. By predicting the time when member replacement is needed, the replacement member pre-procurement is possible.

As described above, according to the image forming apparatus 100 of the embodiment, the state of each photoconductor drum 116b can be correctly estimated from the multidimensional input data.

Moreover, according to the embodiment, the learned model 141 and the estimation unit 142 are mounted on the control unit 140 in the image forming apparatus 100. The estimated state of the photoconductor drum 116b is fed back in real time by such edge computing, and therefore a time loss of self-repairing control is suppressed.

The embodiment of the present disclosure is thus described with reference to the drawings. However, the present disclosure is not limited to the above embodiment, and can be implemented in various embodiments without departing from the gist thereof. In addition, various disclosures can be formed by appropriately combining a plurality of components disclosed in the above embodiment. For example, some components may be deleted from all the components described in the embodiment. Further, the components over different embodiments may be combined as appropriate. In order to facilitate understanding, the drawings schematically illustrate each component as a main body, and the length, number, spacing, and the like of each of the components illustrated in the drawings may differ from actual ones for the convenience of drawing creation. Further, the shape, dimensions, and the like of each component described in the above embodiment are examples and are not particularly limited, and various changes can be made without substantially deviating from the effects of the present disclosure.

For example, in the embodiment, the image forming apparatus 100 is of an electrophotographic system, but the present disclosure is not limited to this. For example, the image forming apparatus 100 may be of an Inkjet system.

Further, in the embodiment, the target member for the state estimation is the photoconductor drum 116b, but the present disclosure is not limited to this. For example, the target member for the state estimation may be the conveying roller 114a.

The present disclosure is available in the field of an image forming apparatus.

What is claimed is:

1. A method for controlling an image forming apparatus by generating a learned model for estimating a state of a member of the image forming apparatus, the method comprising:
   preparing a self-organizing map model having an input layer and an output layer;
   giving multidimensional input data related to the member to the input layer and obtaining a learned model by learning the self-organizing map model until a plurality of nodes of the output layer each indicate a different state of the member;
   estimating a state of the member on the basis of one of the plurality of nodes of the output layer, by giving multidimensional input data related to the member to the input layer; and
   predicting a life of the member on the basis of transition of the state of the member estimated in the estimating,
   wherein the predicting includes recording a plurality of node values output from the learned model in order and predicting time when the node value of a predetermined value is to be output from the learned model, on the basis of transition of a plurality of the node values recorded.

2. The method according to claim 1, wherein
   the member is a photoconductor drum, and
   the input data includes first data indicating a total traveling distance of the photoconductor drum, second data indicating an exposure amount to the photoconductor drum, and third data indicating density of a toner image transferred from the photoconductor drum, and fourth data indicating a frequency of use of the image forming apparatus.

3. The method according to claim 2, further comprising correcting an upper limit such that the member is substantially self-repaired in a case where the exposure amount reaches the upper limit.

4. The method according to claim 1, further comprising issuing a state notification indicating the state of the member estimated in the estimating.

5. An image forming apparatus comprising:
   a member having a certain function; and
   a processor that functions as:
      a learned model obtained by learning of a self-organizing map model having an input layer and an output layer;
      an estimation unit that gives multidimensional input data related to the member to the input layer, and estimates a state of the member on the basis of one of a plurality of nodes of the output layer; and
      a prediction unit that predicts a life of the member on the basis of transition of the state of the member estimated by the estimation unit,
   wherein the prediction unit records a plurality of node values output from the learned model in order and predicts time when the node value of a predetermined value is to be output from the learned model, on the basis of transition of a plurality of the node values recorded.

6. The image forming apparatus according to claim 5, wherein the processor further functions as
   a control unit that controls operation of the member, wherein
   the control unit has the learned model and the estimation unit.

7. The image forming apparatus according to claim 5, wherein
   the member is a photoconductor drum, and
   the input data includes first data indicating a total traveling distance of the photoconductor drum, second data indicating an exposure amount to the photoconductor drum, and third data indicating density of a toner image transferred from the photoconductor drum, and fourth data indicating a frequency of use of the image forming apparatus.

8. The image forming apparatus according to claim 7, wherein the processor further functions as a correction unit that corrects an upper limit such that the member is substantially self-repaired in a case where the exposure amount reaches the upper limit.

9. The image forming apparatus according to claim 5, wherein the processor further functions as a notification unit that issues a state notification indicating the state of the member estimated by the estimation unit.

* * * * *